May 20, 1952     D. H. FISHER     2,597,310
ELECTRONIC APPARATUS
Filed Oct. 12, 1949
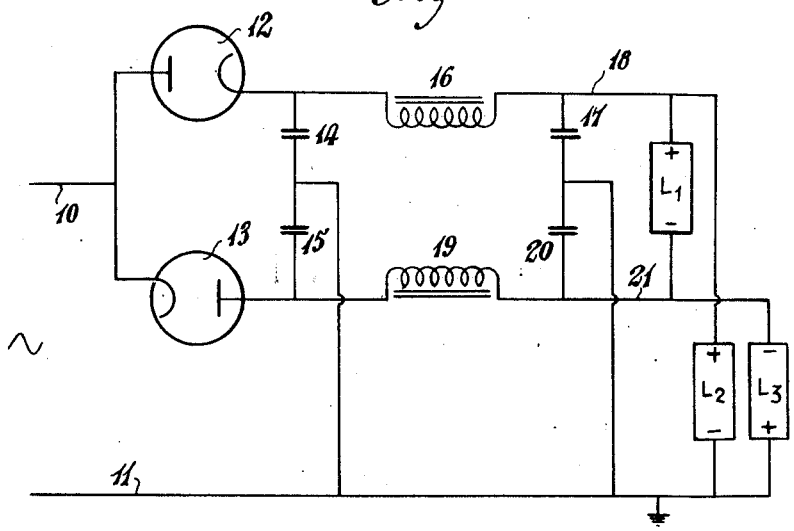
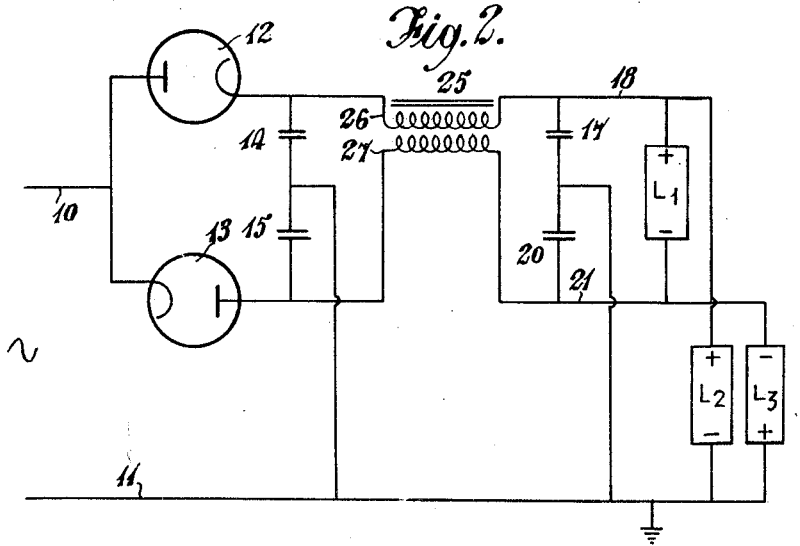
Inventor
*Donald Henry Fisher*
By
*Blair & Black*
Attorneys Patented May 20, 1952

2,597,310

UNITED STATES PATENT OFFICE 2,597,310

ELECTRONIC APPARATUS

Donald Henry Fisher, Cambridge, England, assignor to Pye Limited, Cambridge, England, a British company Application October 12, 1949, Serial No. 120,877
In Great Britain March 31, 1949

5 Claims. (Cl. 171—97)

1

The present invention relates to electronic apparatus for operation from alternating current supply mains and is concerned with arrangements for obtaining the high tension supplies for operation of the apparatus without the use of power transformers. This invention is especially applicable to apparatus for use on low voltage supplies at a voltage of the order of 110 volts and of a periodicity of between 60 and 25 cycles per second.

According to one aspect the present invention comprises apparatus for operation from alternating current supply mains comprising two half wave rectifiers connected in opposite senses to one line of the supply, a reservoir condenser, a smoothing choke and a smoothing condenser associated with each rectifier to provide two high tension supplies one positive and one negative with respect to the other line of supply, load circuits associated with each of the rectifiers and a load circuit associated with both rectifiers.

The high tension voltage across each of the rectifiers will be about equal to the R. M. S. value of the supply voltage while the voltage across both rectifiers will be the sum of the two lower voltages. By using the two lower voltage supplies for those parts of the apparatus which do not require a higher voltage and dividing such load approximately equally between the two supplies and using the higher voltage supply derived from both rectifiers only for the power amplifier or other stages requiring the higher voltages economy and improved voltage regulation in the apparatus can be obtained.

According to another aspect the present invention consists in apparatus for operation from alternating current supply mains comprising two half wave rectifiers connected in opposite senses to one line of the supply, a reservoir condenser connected between the other electrodes of each rectifier and the second line of the supply, a smoothing choke having two similar windings on a common core, one of said windings being connected to each of said other electrodes of the rectifiers between said electrodes and a load circuit, and a smoothing condenser connected across the load circuit. The load, or part of the load may be divided as mentioned above, approximately equal amounts of load being connected between the positive side of the high tension supply and the second line of the supply mains and between the second line of the supply mains and the negative side of the high voltage supply, if desired in addition to a load connected between the positive and negative. By providing

2 that equal or approximately equal currents flow in the two windings of the smoothing choke it is possible to design this choke to give increased inductance since the saturation effect of unbalanced direct current is reduced. A further advantage of this arrangement is that the ripple frequency imposed on the high tension supply is double the frequency of the supply mains. This considerably facilitates the smoothing of the supply especially in cases where the alternating supply is of a periodicity of 25 cycles since the requisite inductance and/or capacity is reduced.

In order that the present invention may be more fully understood two arrangements will now be described with reference to the accompanying drawings, in which:

Figure 1 shows one circuit arrangement in accordance with this invention, and

Figure 2 shows a modification.

In the circuit shown in Fig. 1 the apparatus is connected to two leads 10 and 11 of the alternating current supply, the line 11 advantageously being the earthed line of the supply mains. Connected to the lead 10 are two half wave rectifiers 12 and 13. The anode of the rectifier 12 and the cathode of the rectifier 13 are connected to the lead 10. A reservoir condenser 14 is connected between the cathode of the rectifier 12 and the other lead 11 of the supply mains and another reservoir condenser 15 is connected between the anode of the rectifier 13 and second lead 11 of the supply. Also connected to the cathode of the rectifier 12 is a smoothing choke 16 which, in conjunction with a smoothing condenser 17, smooths one high tension supply which is obtained between the positive lead 18 and the second lead 11 of the supply. The anode of the rectifier 15 is similarly connected to a smoothing choke 19 and smoothing condenser 20 to smooth another high tension supply obtained between the negative lead 21 and the second lead 11 of the supply.

A load circuit $L_1$ is connected between the positive line 18 and the negative line 21 of the high tension supply. This load may represent the power amplifier stages, for example, of the apparatus. Further loads $L_2$ and $L_3$ requiring a lower voltage high tension supply are connected between the positive and negative leads 18 and 21 respectively and the second line 11 of the supply mains. Preferably the loads $L_2$ and $L_3$ are approximately equal so that the currents and voltages are about the same. The voltage across the load $L_1$ is equal to the sum of the voltages across $L_2$ and $L_3$.

In the modification shown in Fig. 2, two separate chokes 16 and 19 are combined in a single double wound choke 25 which is connected in the same way as the separate chokes 16 and 19, the other parts of the circuit also being the same. The windings 26 and 27 of the choke 25 are preferably connected so that the magnetisation of the common core due to the direct currents flowing in these windings tends to balance out. The degree of balance which can be obtained depends on the equality of the currents taken by the loads $L_2$ and $L_3$ but even if these currents are not precisely balanced the amount of unbalanced direct current to be handled by the choke 25 may be comparatively small thereby enabling a choke having a higher inductance for a given size to be provided. A further advantage of this circuit arrangement is that as the ripple components in the two windings are out of phase there is a transfer to opposite sides of the circuit so that the ripple frequency in the load circuits is double that of the supply mains thereby reducing the difficulty of smoothing the high tension supply. This enables the capacity used in the reservoir or smoothing circuits and/or the inductance to be reduced.

It has been found for example that a ripple voltage of approximately 1 volt peak to peak on positive and negative lines can be obtained from 25 cycle 110 volt supply mains using 240 microfarad reservoir condensers and 120 microfarad smoothing condensers in conjunction with a smoothing choke having an inductance of 4 henries per section when a current of 200 milliamps is supplied by each rectifier.

I claim:

1. Apparatus for operation from alternating current supply mains, comprising in combination a half wave rectifier, a supply line connected to the anode of said rectifier, a reservoir condenser connected between the cathode of the rectifier and the other line of the supply, a smoothing choke connected to said cathode, a load circuit connected between said choke and said other line of the supply, a smoothing condenser connected across said load, a second rectifier having its cathode connected to said first mentioned supply line, a reservoir condenser connected between the anode of said second rectifier and said other supply line, a second smoothing choke connected to the anode of said second rectifier, a second load circuit connected between said other line of the supply and said choke, a smoothing condenser connected across said second load and a third load connected across both the first and second loads.

2. Apparatus according to claim 1, wherein the smoothing chokes have a common core.

3. Apparatus for operation from alternating current supply mains, comprising a half wave rectifier, a supply line connected to the anode of said rectifier, a second rectifier having its cathode connected to said supply line, reservoir condensers connected between the cathode of the first rectifier and the other supply line and between the anode of the second rectifier and said other supply line, a smoothing choke connected to the cathode of the first rectifier, a second smoothing choke connected to the anode of the second rectifier, a load circuit connected between said smoothing chokes and a smoothing condenser connected across said load.

4. Apparatus for operation from alternating current supply mains, comprising a half wave rectifier, a supply line connected to the anode of said rectifier, a second rectifier having its cathode connected to said supply line, reservoir condensers connected between the cathode of the first rectifier and the other supply line and between the anode of the second rectifier and said other supply line, a smoothing choke having two windings on a common core, one of said windings being connected to the cathode of the first rectifier and the other winding connected to the anode of the second rectifier, a load circuit connected between said windings and a smoothing condenser connected across said load.

5. Apparatus according to claim 4, wherein at least one further load is connected between a winding of the smoothing choke and the other supply line.

DONALD HENRY FISHER.

REFERENCES CITED

The following references are of record in the file of this patent:

UNITED STATES PATENTS

| Number | Name | Date |
| --- | --- | --- |
| 2,072,278 | Schade | Mar. 2, 1937 |
| 2,407,724 | Rasley | Sept. 17, 1946 |